United States Patent
Cheng

(10) Patent No.: US 7,636,716 B1
(45) Date of Patent: Dec. 22, 2009

(54) METHOD AND ARCHITECTURE FOR BLOCKING EMAIL SPAMS

(75) Inventor: Yun-Chian Cheng, Saratoga, CA (US)

(73) Assignee: Trend Micro Incorporated, Tokyo (JP)

( * ) Notice: Subject to any disclaimer, the term of this patent is extended or adjusted under 35 U.S.C. 154(b) by 1072 days.

(21) Appl. No.: 10/982,540

(22) Filed: Nov. 5, 2004

Related U.S. Application Data

(60) Provisional application No. 60/526,694, filed on Dec. 3, 2003.

(51) Int. Cl.
*G06F 17/30* (2006.01)
(52) U.S. Cl. .......................... 707/6; 707/102; 382/181
(58) Field of Classification Search ...................... 707/6; 709/207
See application file for complete search history.

(56) References Cited

U.S. PATENT DOCUMENTS

| | | | |
|---|---|---|---|
| 5,442,699 A | 8/1995 | Arnold et al. | |
| 5,452,442 A | 9/1995 | Kephart | |
| 5,640,492 A | 6/1997 | Cortes et al. | |
| 5,649,068 A | 7/1997 | Boser et al. | |
| 5,907,834 A | 5/1999 | Kephart et al. | |
| 5,999,932 A * | 12/1999 | Paul ............................. | 707/10 |
| 6,161,130 A | 12/2000 | Horvitz et al. | |
| 6,192,512 B1 | 2/2001 | Chess | |
| 6,279,128 B1 | 8/2001 | Arnold et al. | |
| 6,622,134 B1 | 9/2003 | Sorkin | |
| 6,650,890 B1 | 11/2003 | Irlam et al. | |
| 6,711,583 B2 | 3/2004 | Chess et al. | |
| 6,732,157 B1 | 5/2004 | Gordon et al. | |
| 6,789,200 B1 | 9/2004 | Fiveash et al. | |
| 6,813,712 B1 | 11/2004 | Luke | |
| 6,829,607 B1 * | 12/2004 | Tafoya et al. ................... | 707/6 |
| 6,868,498 B1 * | 3/2005 | Katsikas ....................... | 726/14 |
| 2004/0210640 A1 * | 10/2004 | Chadwick et al. ........... | 709/207 |
| 2005/0044155 A1 * | 2/2005 | Kaminski et al. ........... | 709/206 |
| 2005/0120019 A1 * | 6/2005 | Rigoutsos et al. .............. | 707/6 |
| 2006/0031325 A1 * | 2/2006 | Cheng ......................... | 709/206 |

FOREIGN PATENT DOCUMENTS

| | | |
|---|---|---|
| EP | 1 377 892 B1 | 9/2004 |
| WO | WO 02/084459 A1 | 10/2002 |

OTHER PUBLICATIONS

Spam Assassin 2.64, Aug. 2004, 4 sheets. Webpage [online] [retrieved on Sep. 7, 2004]. Retrieved from the Internet:: <URL:http://www.spamassasin.apache.org.html>.

(Continued)

*Primary Examiner*—John R. Cottingham
*Assistant Examiner*—Noosha Arjomandi
(74) *Attorney, Agent, or Firm*—Okamoto & Benedicto LLP

(57) ABSTRACT

In a method for blocking email spams, the header fields and the message body of a received email first are identified. Predefined patterns are identified by matching in the header fields and message body, wherein a data structure of characteristic information is created for each recognized pattern. The characteristic information then are analyzed by rule inference to determine whether the received email is a spam.

21 Claims, 6 Drawing Sheets

OTHER PUBLICATIONS

The Formulation of Support Vector Machine, 1998, 2 sheets [retrieved on Jul. 21, 2004]. Retrieved from the Internet <URL:http://www.mi-eng.cam.ac.uk/kkc21/main/node8.html>.

New Advance Anti-Spam Service, "Aladdin Knowledge Systems Launches New Advanced Anti-Spam Service" Jun. 26, 2003. 3 sheets. Webpage [online] [retrieved on Jul. 21, 2004]. Retrieved from the Internet: <URL:http://www.ealladin.com/new/2003/esafe/anti-spam.asp.html>.

SVM-Light Support Vector Machine 6.01, Feb. 2004. 14 sheets. Webpage [online][retrieved on Sep. 9, 2004]. Retrieved from the internet: <URL:http://www.cs.cornell.edu/People/tj/svm_light/html>.

Steve Ramsay's Guide to Regular Expressions, Electronic Text Center, University of Virginia. 12 sheets [retrieved on Sep. 2, 2004]. Retreived from the Internet: <URL:http://www.etext.lib.virginia.edu/helpsheets/regex.html>.

\* cited by examiner

METHOD AND ARCHITECTURE FOR BLOCKING EMAIL SPAMS

REFERENCE TO RELATED APPLICATION

The present application claims the benefit of U.S. Provisional Application No. 60/526,694, entitled "Method And Architecture For Blocking E-Mail Spams," filed by Yun-Chian Cheng on Dec. 3, 2003, which is incorporated herein by reference in its entirety.

TECHNICAL BACKGROUND

1. Field of the Invention

The present invention generally relates to a method and software architecture for blocking email spams, and more particularly, to a method and software architecture that are implemented in a computer host to block email spasm.

2. Description of the Related Art

Electronic mails (or "emails") have become a privileged way of communication between people since they can be distributed rapidly at low cost through diverse communication networks such as Internet network. Internet and email popularization has made electronic messages very attractive as marketing and advertisement media. As a result, it is not uncommon now for a user of emails to receive unsolicited electronic mails (commonly called "spams" or "junk mails") from unknown originators along with legitimate and regular email messages from identifiable authors.

An email user may not desire the dissemination of email spams in regard of many considerations. Email spams may carry unsolicited advertisements such as financial or commercial advertisements, or objectionable, fraudulent or dangerous content such as pornography, hate propaganda and the like. Substantial time may be spent to open the spam and follow up on its advertising content. In the process of deleting the junk mails, the user further may inadvertently discard or overlook other important messages. Aside unsolicited advertisements, email spams further can constitute a serious security problem because it may carry viruses or dangerous execution codes susceptible of damaging the computer host.

Spam authors (or "spammers") use two primary techniques to disseminate unsolicited email spams, which are the relaying technique and the directing technique. Relaying technique uses intermediate sites to relay the spam from the spammer. These relay sites usually are open sites without sufficiently strict system administration practices, which allow uncontrolled spam relaying to a large number of addresses. Since using SMTP (simple mail transfer protocol) from a PC provides the ability to forge emails, spam or junk mails alternatively may be also directly sent from a dialup PC to a recipient host.

Despite efforts have been made in the past to combat spam dissemination, more developments however are needed to effectively block email spams at the recipient computer host.

SUMMARY OF THE INVENTION

According to some embodiments, an anti-spam software architecture is implemented in a computer host to block unsolicited emails. In some variations, the anti-spam software architecture comprises a calling program anti-spam module; the calling program identifies a message body and message header fields from a received email, and operates to block the email if the email is determined as a spam; the anti-spam module, called by the calling program, identifies predefined patterns in the message header fields and message body, and creates a data structure of characteristic information associated with the matched patterns, the characteristic information being analyzed to determine whether the email is a spam. In some embodiments, the received email is parsed to identify the message header fields and the message body. In some variations, the calling program is a mail transportation agent.

In some embodiments, the anti-spam module comprises a message scanner that matches the predefined patterns as keywords and regular expressions in the message header fields and message body, and accordingly creates a data structure of characteristic information associated with the recognized matches. In some embodiments, the anti-spam module comprises a rule engine that analyzes the characteristic information of the matched pattern from the message scanner to determine whether the email is a spam. In some variations, the rule engine is a rule-based expert system that analyzes by rule inference the characteristic information of the matched pattern to determine whether the email is a spam.

In some variant embodiments, the rule engine implements rules loaded from a rule file. In some embodiments, the rule file is configured as a readable character based rule file to allow a user to view the rule description. In other variations, the rule file is configured in a manner to allow a user to enable or disable the rules. In further variations, the rule file is configured in a manner to allow a user to modify the weights of the rules.

In some embodiments, a method of blocking email spams is described. In some embodiments, the method includes matching a predefined pattern in a message body and message header fields of an email received on a computer host, creating a data structure of characteristic information associated with the matched pattern, analyzing the characteristic information of the matched pattern to determine whether the email is a spam, and if the email is a spam, blocking the spam. In some embodiment, the email is parsed to identify the message header fields and the message body. In some variations, a fast lexical analyzer generator is used to create a scanner program that matches the predefined pattern in the message header fields and the message body. In some embodiments, the characteristic information of the matched pattern includes information for locating the matched pattern in the message header fields and message body, and information describing the content of the matched pattern.

In some embodiments, the characteristic information associated with the matched pattern is analyzed by rule inference. In some variations, heuristic rules are implemented to perform the rule inference process. In some variations, a history of rules triggered in the rule inference process is returned if the email is determined as being a spam. In some embodiments, a rule file is configured to describe the rules implemented in the rule inference process. In some variations, the rule file is configured as a readable character based rule file so as to allow a user to view the description of the rules. In other variations, the rule file is configured in a manner to allow a user to enable or disable the rules. In other variations, the rule file is configured in a manner to allow a user to modify weights of the rules.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENT(S)

The invention provides an anti-spam software architecture that is implemented in a computer host to block unsolicited emails and prevent their reaching the user mailbox. The architecture comprises an anti-spam module that receives as input an email message from a calling program. The anti-spam module includes a message scanner and a rule engine. The message scanner scans and analyzes the email message by identifying keywords and/or regular expressions, and creates a data structure of characteristic information associated with the recognized keywords and/or regular expressions. The characteristic information then is passed to the rule engine to determine whether the email message is a spam. If the email is a spam, the rule engine returns a list of rules that have been used to decide the message is a spam. The message scanner then returns this result to the calling program. If the message is not a spam, the calling program passes the email message to other filters for further downstream processing. If the analyzed email is a spam, then it is transferred to an action module that performs adequate blocking actions. A rule file is configured to describe the rules implemented in the rule engine to determine whether an email message is a spam.

Figure 1:
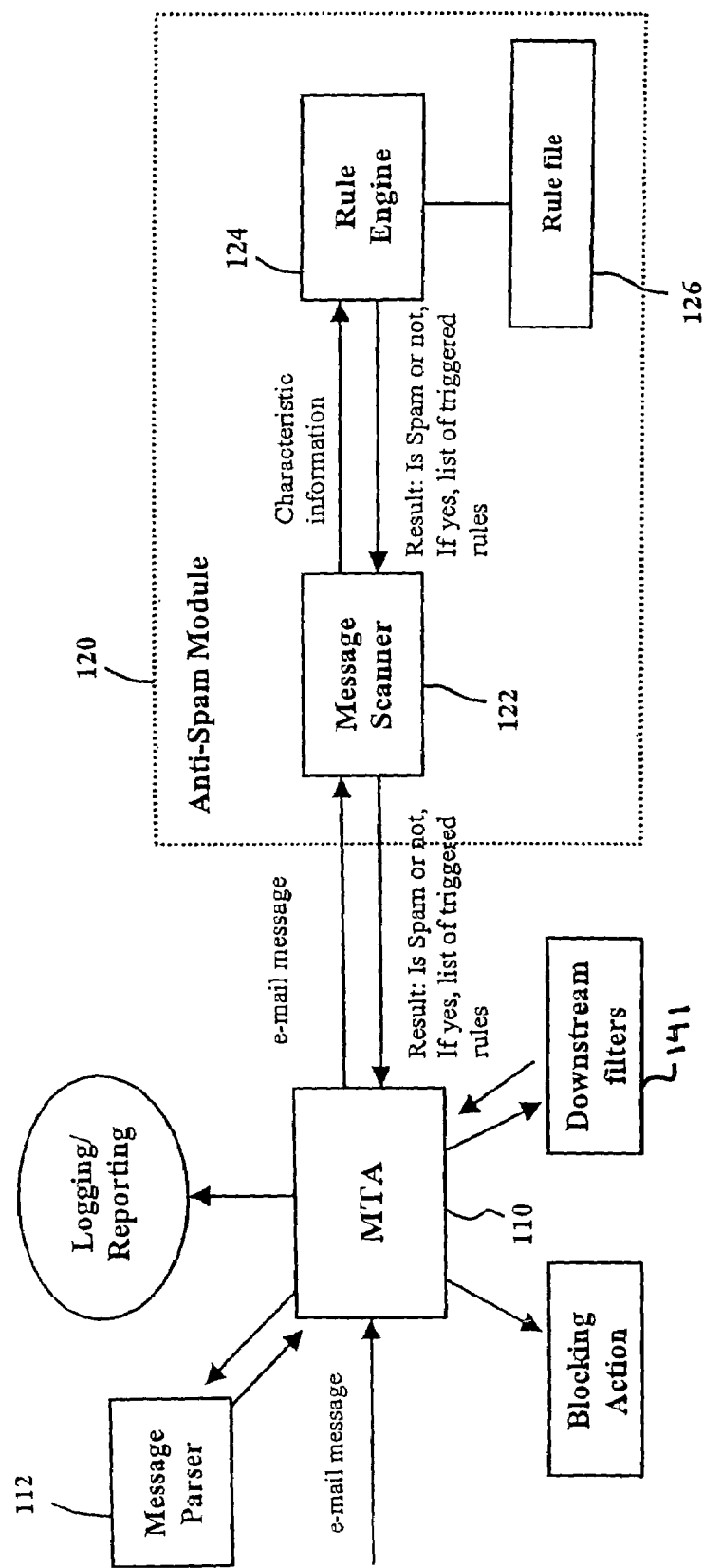
FIG. 1 is a block diagram of an anti-spam software architecture implemented in a computer host to block unsolicited emails according to an embodiment of the invention.

FIG. 1 is a block diagram of an anti-spam software architecture implemented in a computer host to block unsolicited emails according to an embodiment of the invention. The anti-spam software architecture implemented in a computer host includes a mail transportation agent (MTA) 110 and an anti-spam module 120. The mail transportation agent 110 handles emails reception tasks, and calls the anti-spam module 120 to perform analysis and determine whether a received email message is a spam. In an example, the mail transportation agent 110 is also provided with logging and reporting functions. For each received email, the mail transportations agent 110 calls a message parser module 112 to first parse the email and identify header fields and body of the email message. The mail transportation agent 110 then passes the parsed message to a message scanner 122 of the anti-spam module 120 to determine whether the message is a spam. The message scanner 122 identifies all the patterns of interest, and builds a list of characteristic information associated with the recognized patterns. This list of characteristic information then is passed to a rule engine 124 of the anti-spam module 120 that consequently determines whether the email is a spam. The rules implemented in the rule engine 124 are described in a rule file 126. The result is returned to the message scanner 122 that then relays it back to the mail transportation agent 110. The mail transportation agent 110 subsequently can decide whether to pass the regular email to downstream filters 141 or take blocking actions for spam messages. For example, identified message spams could be placed in a quarantine area defined in a specific file or file directory, or simply deleted.

According to an exemplary embodiment, the mail transportation agent 110 calls a function TmIsMsgSpam (TmMsgMailMessage*message, char*rules_matched) to invoke the anti-spam module 120. The function TmIsMsgSpam( ) has two parameters: one input parameter message is the email message received by the mail transportation agent 110, and one output parameter Rules_matched is used to describe the list of rules matched by the rule engine 124. The function returns 1 if the inputted message is a spam, otherwise it returns 0. The message scanner 122 of the anti-spam module 120 receives, the email message, and calls a scanner program for separate analysis of the message header fields and message body.

Figure 2:
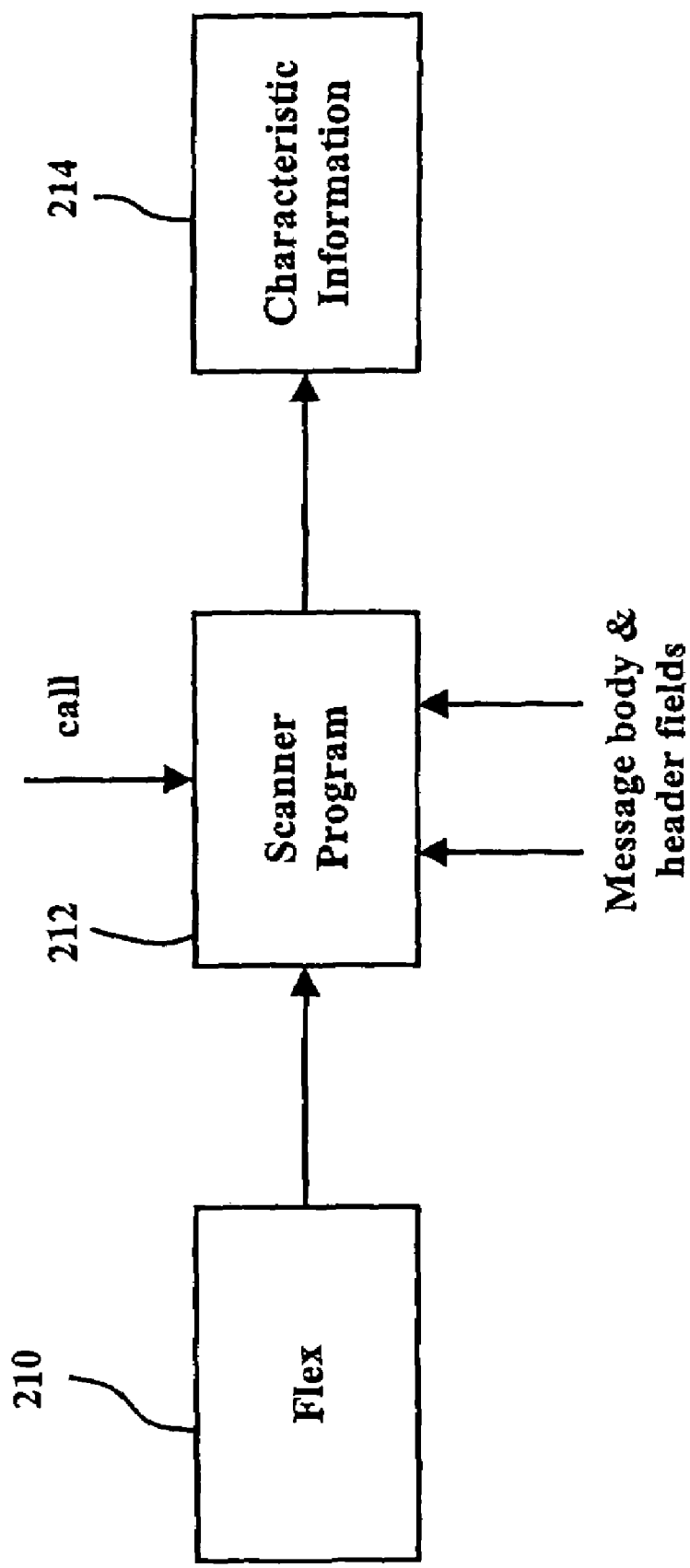
FIG. 2 is a flowchart of a process for analyzing the message header fields and message body of an email according to an embodiment of the invention.

FIG. 2 is a flowchart of a process for analyzing the message header fields and message body according to an embodiment of the invention. According to an embodiment, a fast lexical analyzer generator (commonly called "Flex") 210 can be used to generate the scanner program 212. Flex reads given input files for a description of the scanner program to generate. This description typically is in the form of regular expressions and C programming code. Flex generates as output a source file which then is compiled to produce the executable scanner program. Although Flex is envisaged in this embodiment, other generators may also be suitable with the invention. Furthermore, other solutions of implementation may additionally include the use of parser generators such as YACC or Bison to identify important parts of the email for performing further analysis.

When the generated scanner program 212 runs, it analyzes the inputted message header fields and message body and looks for strings that match with any of text patterns predefined in the scanner program. These patterns are defined as regular expressions and keywords. Once the match is determined, the text corresponding to the match, called a token, is typically made available in a global character pointer, and the length of the token is accessible in a global integer. The remaining input then is scanned for another match. In respect of the message header, the scanner program particularly identifies varibus header types. According to an example of the invention, the identified header types can include, but is not limited to, an originator header ("From:" field) indicating the agent (which may be a person, a system or a process) that created the message, a recipient header (including "To:" field) indicating the recipient(s) of the email, a date header ("Date:" field) indicating the date of the email, a subject header, or a received header (designated by the "Received:" field) showing the path the email has effectively taken to reach the target host.

Each time the scanner program 212 recognizes a pattern in the message, a data structure is created to record characteristic information 214 associated with the recognized token. According to an embodiment, the characteristic information 214 includes information for locating the recognized token, and information for describing the content of the matched pattern. Information useful for locating the recognized token can include items such as a header type or body, a corresponding line number, a starting character position, a position of the token in the line, a position of the word in the line, and the like.

Information useful for describing the content of the matched pattern such as a token length, the type of the tokens, character strings recognized as the tokens, and the like. When tokens are recognized in each line, further characteristic information for this line also has to be recorded; these other characteristic information can include the line number, the total number of tokens of interest in this line, the total number of words of interest in this line, the total character length in this line, and the like. After the message has been analyzed, the message scanner 122 then passes the elaborated list of characteristic information to the rule engine 124 for further analysis.

Figure 3A:
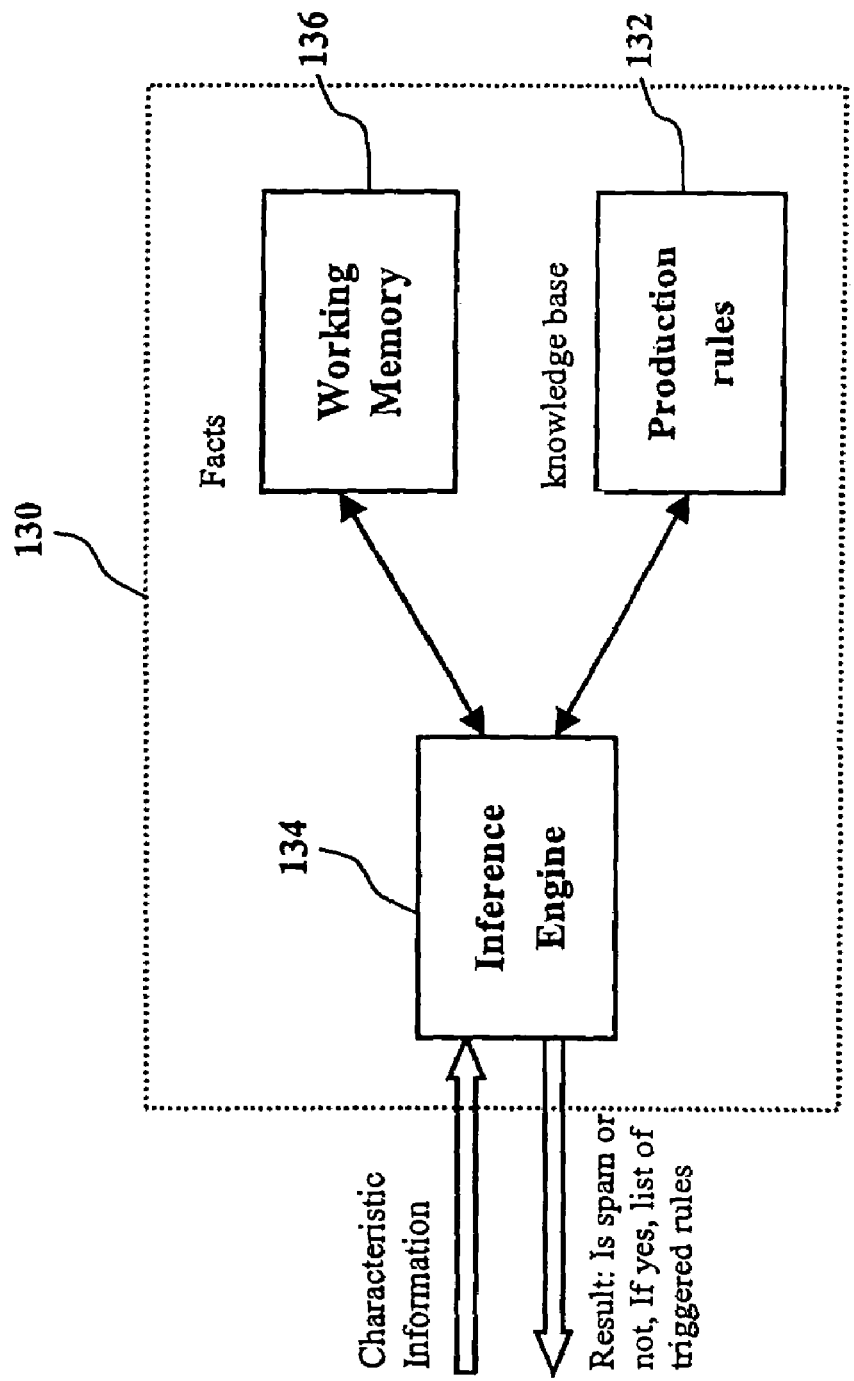
FIG. 3A is an exemplary representation of a rule-based expert system implemented in an anti-spam software architecture according to an embodiment of the invention.

According to an embodiment of the invention, the rule engine 124 is a rule-based expert system that implements heuristic production rules for determining whether an email is a spam. FIG. 3A is an exemplary representation of a rule-based expert system (ES) 130 implemented in an anti-spam software architecture according to an embodiment of the invention. The rule-based expert system 130 uses a rule-based programming language to describe production rules 132. The production rules 132 constitute the knowledge base used for determining email spams. The characteristic information of matched patterns from the message scanner is stored as facts in working memory 136 of the rule-based ES 130. To determine whether an email is a spam, an inference engine 134 of the rule-based ES 130 examines and matches the facts stored in the working memory 136 with the production rules 132, and may execute (or "fire") actions whenever they appear on the action list of a rule when the conditions of the rule are either satisfied or unsatisfied (hereafter, "fired rule" or "triggered rule" will mean a rule which corresponding actions have been executed). When the determination process reaches a result, in other words it is found that the email is either a spam or not a spam, the history of all the fired rules is established. The inference engine 134 then returns the result and the list of fired rules to the message scanner.

According to an example of the invention, the ruled-based ES 130 is implemented with the ruled-based programming language OPS/R2; but other programming languages may be also suitable for implementing the rule engine of the invention. Advantages of rules written in rule-based programming languages are that they are easy to understand and maintain. OPS/R2 further has a fast inference engine and easy interface with C or C++ code programs.

Figure 3B:
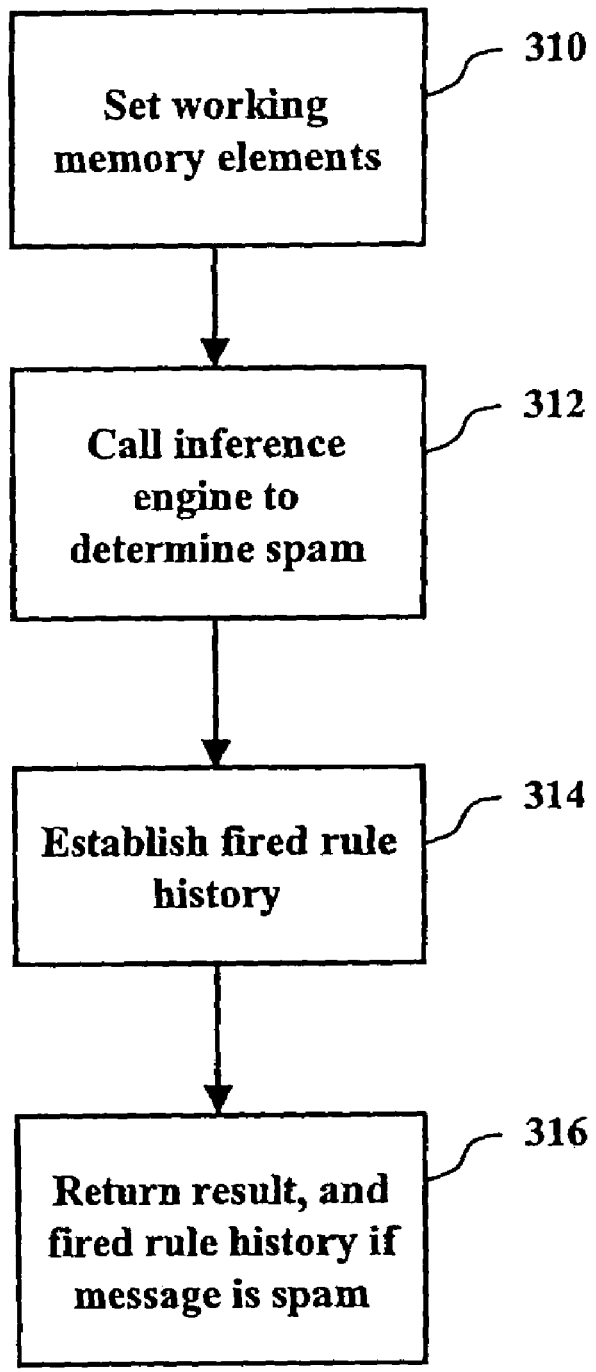
FIG. 3B is a flowchart of a rule engine process implemented in an anti-spam software architecture according to an embodiment of the invention.

FIG. 3B is a flowchart of a rule engine process implemented in an anti-spam software architecture according to an embodiment of the invention. Once the message scanner has completed the scan of the email message and constructed the list of characteristic items associated with the matched patterns, the message scanner operates to set all the working memory elements for each of the previously prepared characteristic items (310). In an example of implementation, the message scanner may call a C/C++ procedure that in turn calls OPS/R2 routines to set the working memory elements. The inference engine then is invoked to determine by rule inference whether the message is a spam (312). If the message is a spam, history of all the fired rules is established (314). According to an embodiment, the rule history may be established from the ultimately fired rule that converts the history of all the fired rules into a character string and calls a C/C++ procedure to return the result and the list of fired rules. The inference engine then returns to the message scanner the result establishing whether the email is a spam accompanied with, if the message has been determined as a spam, the history of the fired rules (316).

Referring to FIG. 1, the rules implemented in the rule engine 124 are loaded and updated from the rule file 126. According to an embodiment, the rule file 126 is configured as a readable character based rule file to allow a user to view the descriptions of the rules and their weights. It is also possible to allow a user to enable/disable rule categories or individual rules, and modify the rule weights set in the rule file 126. All the items in the rule file 126 are used to create corresponding data structures in the inference engine 134. The rules implemented in the inference engine 134 are partitioned into multiple clusters according to the characteristics of the rules. Diverse clusters of rules can be defined, such as rules for headers, rules for body, rules for both body and headers, rules for sex/pornographic matters, or rules for commercial, financial or hate categories. Breaking a large rule set into multiple rule clusters can improve run time performance and maintenance of the rules.

Figure 4:
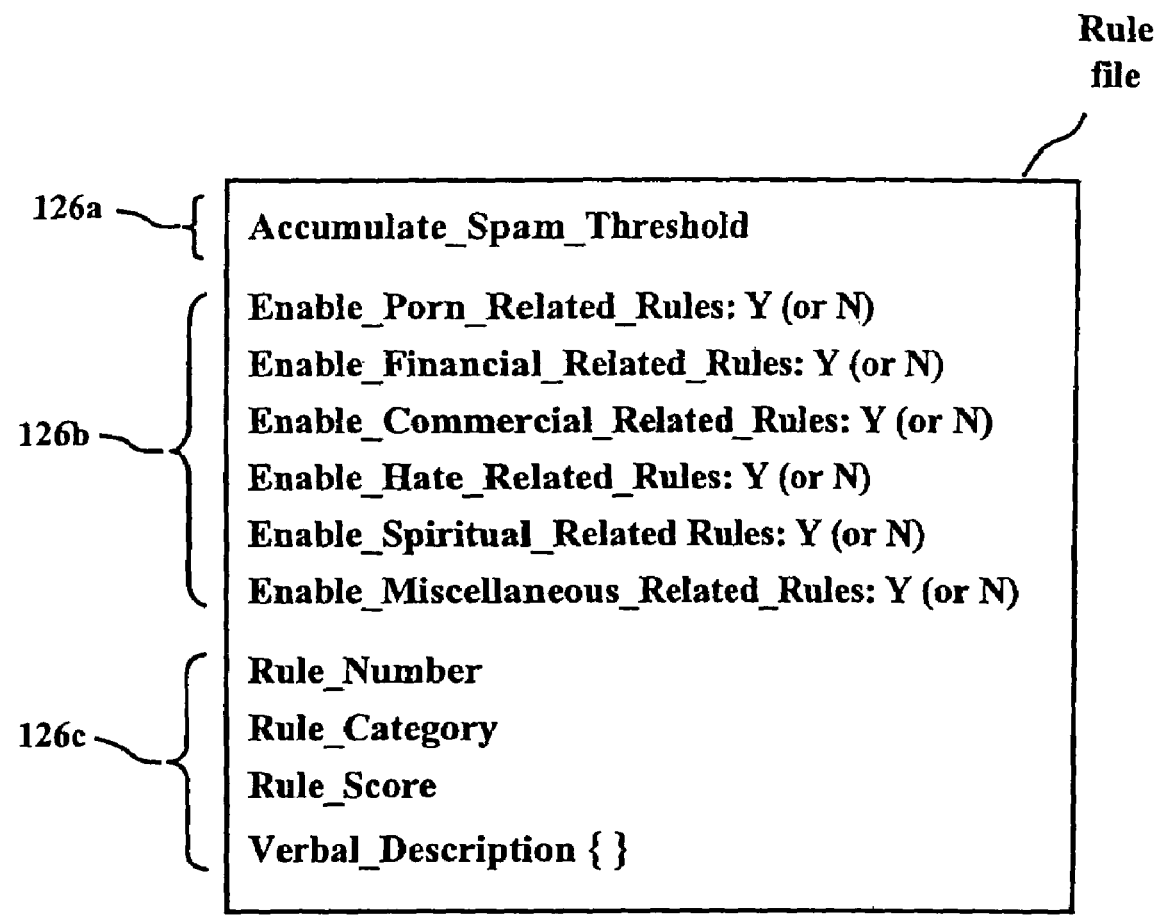
FIG. 4 illustrates an exemplary format of a rule file implemented according to an embodiment of the invention.

The rule file 126 can be configured according to any adequate data formats. FIG. 4 illustrates an exemplary format of the rule file including three parts. A first part 126a has one line used to indicate the accumulated spam threshold. If the rule engine detects that the accumulated hits are higher than this threshold, the corresponding analyzed email is identified as a spam. A second part 126b tells the rule engine whether to enable or disable rule categories or individual rules. A third part 126c contains lines for rule descriptions. Each line is used to define a rule number, a rule category, a rule score and a verbal description of the rule. According to an example of the invention, the rule category can contain, for example, two characters: a first character identifying either the body or the header, and a second character identifying the rule category. The rule score may be used to indicate the relative weight of the rule.

To optimize the rule engine, the weights of the rules and the threshold weight may be fine tuned to meet required blocking rate (percentage of blocked spams) and false-positive rate (percentage of regular messages incorrectly caught as spams). The rule weights may be determined by intuition and possibly made accessible to the user for manual settings. Alternatively, specific calculation methods may be implemented to provide tools that can optimize the rule weights for obtaining a higher blocking rate with a lower false-positive rate.

Figure 5:
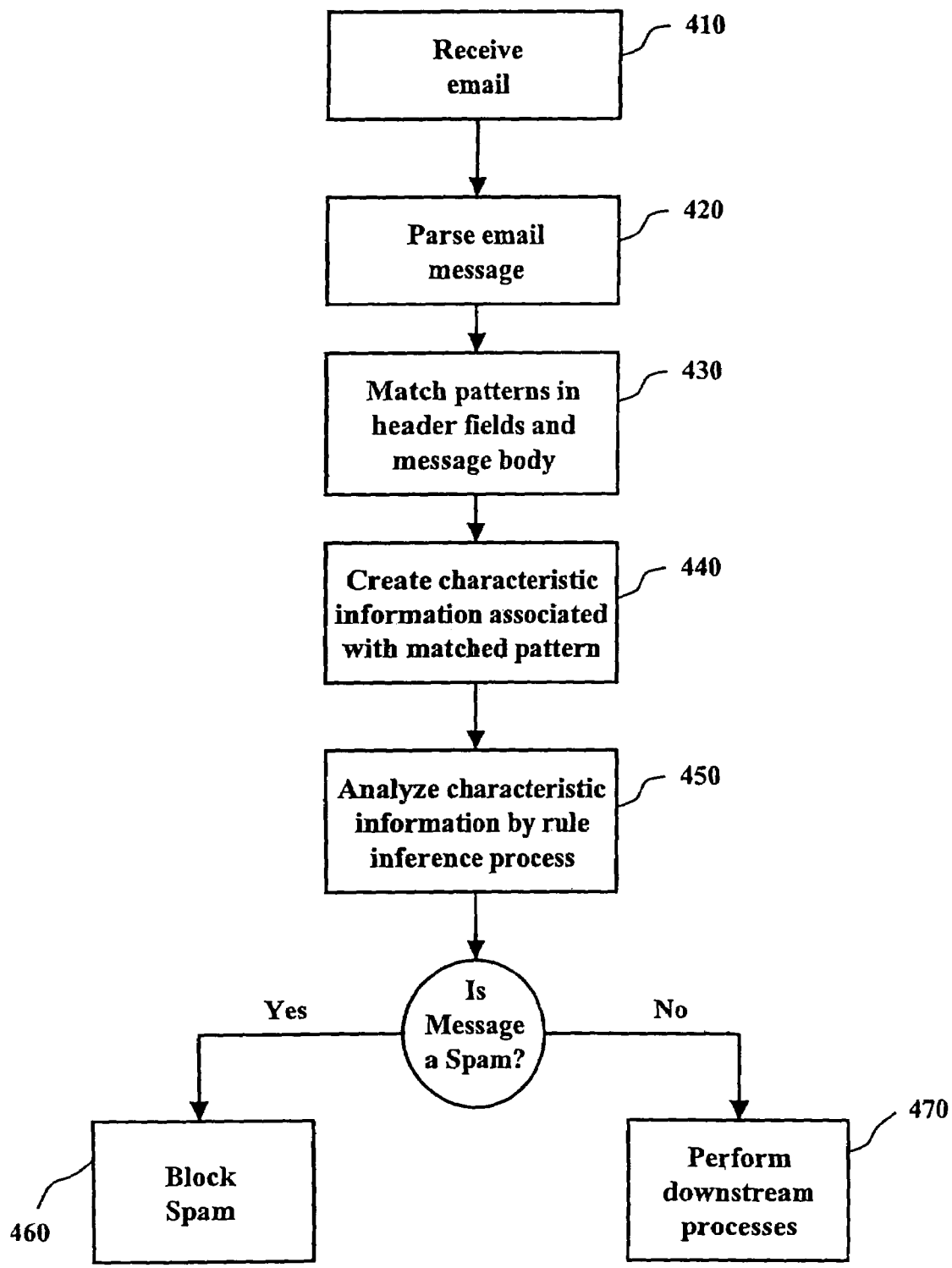
FIG. 5 is a flowchart of a method of blocking email spams according to an embodiment of the invention.

Now referring to FIG. 5, a flowchart schematically illustrates a method of blocking email spams according to an embodiment of the invention. At an initial step 410, an email message is received on a user host. The received email message is parsed to identify the message head fields and message body (420). The message header fields and the message body then are separately analyzed to identify by matching pre-defined patterns (430). For each pattern recognized as keyword or regular expression in the message header fields and message body, an associated list of characteristic information is created (440). The characteristic information is analyzed via a rule inference process to determine whether the received message is a spam (450). If the message is determined as a spam, then adequate blocking actions are performed (460). For example, the spam can be isolated in a quarantine file or file directory, or deleted. Otherwise, the regular email message passes through other downstream processing steps (470).

It would be apparent to one skilled in the art that the invention can be embodied in various ways and implemented in many variations. Such variations are not to be regarded as a departure from the spirit and scope of the invention. In particular, the process steps of the method according to the invention include methods having substantially the same processing steps as the method of the invention to achieve substantially the same results. Substitutions and modifications have been suggested in the foregoing detailed description and others will occur to the person of ordinary skill in the art. All such modifications as would be clear to one skilled in the art are intended to be included within the scope of the following claims and their equivalents.

What is claimed is:

1. A method of blocking an email spam, comprising:
matching a predefined pattern in a message body and message header fields of an email received on a computer host;
creating a data structure of characteristic information corresponding to the matched pattern, the data structure of characteristic information being created after the email is received on the computer host;
wherein the characteristic information of the matched pattern includes information for locating the matched pattern in the message header fields or message body, and information describing the content of the matched pattern;
analyzing the characteristic information of the matched pattern to determine whether the email is a spare; and
if the email is a spam, blocking the spam.

2. The method according to claim 1, wherein the received email is parsed to identify the message header fields and the message body.

3. The method according to claim 1, wherein a rule inference process is performed to analyze the characteristic information and determine whether the email is a spam.

4. The method according to claim 3, wherein heuristic rules are implemented in the rule inference process to determine whether the email is a spam.

5. The method according to claim 3, wherein a history of rules fired in the rule inference process is returned if the email is determined as being a spam.

6. The method according to claim 1, wherein matching the predefined pattern in the message header fields and the message body is performed by a scanner program generated by a fast lexical analyzer generator.

7. The method according to claim 2, wherein a rule file is configured to describe the rules implemented in the rule inference process.

8. The method according to claim 7, wherein the rule file is configured as a readable character based rule file so as to allow a user to view the description of the rules.

9. The method according to claim 7, wherein the rule file is configured in a manner to allow a user to enable or disable the rules.

10. The method according to claim 7, wherein the rule file is configured in a manner to allow a user to modify weights of the rules.

11. An anti-spam architecture implemented in a computer host to block email spams, comprising:
a calling program, identifying a message body and message header fields from a received email, and operating to block the email if the email is determined as a spam; and
an anti-spam module, called by the calling program to determine whether the received email is a spare and accordingly informing the calling program of the result, wherein the anti-spam module identifies at least a predefined pattern in the message header fields and message body, and creates a data structure of characteristic information corresponding to the matched pattern after receiving the email the characteristic information being analyzed to determine whether the email is a spare;
wherein the characteristic information associated with the matched pattern includes information for locating the matched patterns in the message header field and message body, and information describing the content of the matched pattern.

12. The anti-spam architecture according to claim 11, wherein the calling program is a mail transportation agent.

13. The anti-spam architecture according to claim 11, wherein the anti-spam module comprises a message scanner that matches the predefined pattern as a keyword or regular expression in the message header fields and message body, and creates a data structure of characteristic information corresponding to the matched pattern.

14. The anti-spam architecture according to claim 11, wherein the anti-spam module comprises a rule-based expert system that analyzes by rule inference the characteristic information of the matched pattern to determine whether the email is a spam.

15. The anti-spam architecture according to claim 13, wherein the message scanner calls a scanner program generated by a fast lexical analyzer generator.

16. The anti-spam architecture according to claim 14, wherein the rule-based expert system implements rules loaded from a rule file.

17. The anti-spam architecture according to claim 14, wherein the rule-based expert system returns a history of rules fired in the rule inference process if the email is determined as being a spam.

18. The anti-spam architecture according to claim 14, wherein the rules implemented in the rule-based expert system includes heuristic rules.

19. The anti-spam architecture according to claim 16, wherein the rule file is configured as a readable character based rule file to allow a user to view the description of the rules.

20. The anti-spam architecture according to claim 16, wherein the rule file is configured in a manner to allow a user to enable or disable the rules.

21. The anti-spam architecture according to claim 16, wherein the rule file is configured in a manner to allow a user to modify weights of the rules.

* * * * *

UNITED STATES PATENT AND TRADEMARK OFFICE
CERTIFICATE OF CORRECTION

| | |
|---|---|
| PATENT NO. | : 7,636,716 B1 |
| APPLICATION NO. | : 10/982540 |
| DATED | : December 22, 2009 |
| INVENTOR(S) | : Cheng |

It is certified that error appears in the above-identified patent and that said Letters Patent is hereby corrected as shown below:

on column 7, line 20, after "email is a", replace "spare" with

-- spam -- on column 8, line 2, after "email is a", replace "spare" with

-- spam -- on column 8, line 9, after "email is a", replace "spare" with

-- spam --

Signed and Sealed this

Ninth Day of February, 2010

David J. Kappos
*Director of the United States Patent and Trademark Office*